(12) United States Patent
Chen et al.

(10) Patent No.: US 11,308,902 B2
(45) Date of Patent: Apr. 19, 2022

(54) SPATIAL LIGHT MODULATOR

(71) Applicant: National Chiao Tung University, Hsinchu (TW)

(72) Inventors: Huang-Ming Chen, Hsinchu County (TW); Jhou-Pu Yang, Hsinchu (TW)

(73) Assignee: NATIONAL YANG MING CHIAO TUNG UNIVERSITY, Hsinchu (TW)

(*) Notice: Subject to any disclaimer, the term of this patent is extended or adjusted under 35 U.S.C. 154(b) by 0 days.

(21) Appl. No.: 17/079,556

(22) Filed: Oct. 26, 2020

(65) Prior Publication Data
US 2021/0210033 A1 Jul. 8, 2021

(30) Foreign Application Priority Data
Jan. 7, 2020 (TW) .................. 109100382

(51) Int. Cl.
*G09G 3/36* (2006.01)
*G02F 1/1337* (2006.01)

(52) U.S. Cl.
CPC ..... *G09G 3/3611* (2013.01); *G02F 1/133723* (2013.01); *G09G 2320/0247* (2013.01)

(58) Field of Classification Search
CPC ........... C09K 19/00; G09G 2320/0247; G09G 2340/0435; G09G 3/3611; G02F 1/133723; G02F 1/136277
See application file for complete search history.

(56) References Cited

U.S. PATENT DOCUMENTS

2016/0077367 A1* 3/2016 Lo .................. H04N 9/3123
349/25

OTHER PUBLICATIONS

Jhou-Pu Yang, Huang-Ming Philip Chen, Yuge Huang, Shin-Tson Wu, Cynthia Hsu, Lily Ting, and Ron Hsu, "Sub-KHz 4000-PPI LCoS Phase Modulator for Holographic Displays", May 2018, SID Symposium Digest of Technical Papers, 49(1):772-775.

* cited by examiner

*Primary Examiner* — Kenneth Bukowski
(74) *Attorney, Agent, or Firm* — Bacon & Thomas, PLLC (57) ABSTRACT

A spatial light modulator includes a panel and a driver board. The panel includes an ultra-high pixel density backplane and a liquid crystal layer. The ultra-high pixel density backplane includes a pixel array with at least 4000 PPI. The liquid crystal layer includes an ultra-high figure-of-merit liquid crystal material with a first figure-of-merit value. The driver board is connected to the panel for driving the panel by executing a fast panel driving procedure design to achieve low phase error.

10 Claims, 4 Drawing Sheets

| LCOS Driver | Resolution PWM-ID | Bitplane (GL) | LUT (GL) | swp | mcksperrow mclkfreq icksperrow | (MHz) | iclkfreq (MHz) | modrow twgt | Tclks (ms) |
|---|---|---|---|---|---|---|---|---|---|
| FPGA | 2K1K a10x2 | 10-0-0-0 (1024) | 8-bits (256) | 10 | m=31 i=17 | 333 | 175 | 1080 1083 | 1.02 |
| FPGA | 4K2K a11x2 | 8-0-3-0 (1024) | | 11 | m=60 i=17 | 416 | 175 | 2160 2164 | 3.40 |

FIG. 6

| LCOS-SLM (Vw,Vb) | Linearity 1. RMS 2. APAE% | Spatially Anamorphic Phenomenon Precision (mSTD) | Accuracy (mAPAE%) | CGH Imaging (0-order%) | Temporal Fluctuations RTTr+Td (10%-90%) | Stability (mSTD,P-P) |
|---|---|---|---|---|---|---|
| JDC 2KSRK (4.43,0.84) | 0.03 π 0.96% | 0.03 π | 17.80% | 17.43% | 10.04+16.40 =26.44ms | mSTD:0.05 π P-P:5.0% |
| HEP LETO (0.45,1.55) | 0.04 π 1.37% | 0.04 π | 11.71% | 11.45% | 7.48+18.40 =25.88ms | mSTD:0.03 π P-P:3.3% |
| NCTU TKS (2.10,0.70) | 0.01 π 0.36% | 0.04 π | 8.20% | 8.25% | 2.62+4.49 =7.00ms | mSTD:0.03 π P-P:2.6% |

SPATIAL LIGHT MODULATOR

BACKGROUND

1. Field of the Disclosure

The present disclosure relates to the technical field of spatial light modulators.

2. Description of Related Art

In the current level of technology, it is required for a spatial light modulator to satisfy the characteristics, such as low voltage drive, low liquid crystal response time and high electric driving frequency, so as to achieve excellent phase stability. However, with the development of science and technology, there is a demand for faster full-phase-modulation liquid crystal response time and higher panel pixel density in the application of liquid crystal on silicon spatial light modulator (LCOS-SLM). In addition, some spatial light modulators on the market are typically driven by digital driving scheme, and the phase stability thereof is relatively low in comparison with the analog driving scheme. Unfortunately, it is difficult to achieve high electric driving frequency by using an analog driving scheme on a panel with ultra-high pixel density, resulting in high difficulty in suppressing the phase temporal fluctuation. Moreover, under high-speed liquid crystal response, the analog driving scheme is not easy to achieve high phase linearity in comparison with the digital driving scheme.

Therefore, it is desirable to provide an improved spatial light modulator to mitigate and/or obviate the aforementioned problems.

SUMMARY

An object of the present disclosure is to provide a spatial light modulator, which includes a panel and a panel driver. The panel includes a backplane and a liquid crystal layer, wherein the backplane includes a pixel array with a pixel density of at least 4000 PPI, and the liquid crystal layer includes a liquid crystal material having a first figure-of-merit. The panel driver is electrically connected to the panel, so as to drive the panel according to a fast panel driving procedure design, where the first figure-of-merit satisfies a condition:

$$FoM\text{-}1 = \frac{\Delta n^2}{\left(\frac{\gamma_1}{k_{11}}\right)} > 15 \ \mu m^2/s,$$

where FoM-1 represents the first figure-of-merit, $\Delta n$ represents a birefringence of the liquid crystal material, $\gamma_1$ represents a rotational viscosity coefficient of the liquid crystal material, and $k_{11}$ represents a splay elastic constant of the liquid crystal material.

Other objects, advantages, and novel features of the disclosure will become more apparent from the following detailed description when taken in conjunction with the accompanying drawings.

DETAILED DESCRIPTION

The following embodiments describe the implementation and operation principles of the spatial light modulator disclosed in the present disclosure. Those skilled in the art to which the present disclosure pertains may understand the features and effects of this disclosure through the above-mentioned embodiments, and may perform combination, modification, replacement or adaption based on the spirit of the present disclosure.

The term "connected" as used herein refers to aspects such as direct connection or indirect connection, and is not limited thereto. The term "when . . . " herein may denote "during the time that . . . ", "before . . . ", or "after . . . " and is not limited thereto.

The ordinals recited herein such as "first", "second" and so on are intended only to describe the elements claimed and imply or represent neither that the claimed elements have any preceding ordinals, nor that sequence between one claimed element and another claimed element or between steps of a manufacturing method. The use of these ordinals is merely to differentiate one claimed element having a certain designation from another claimed element having the same designation.

When multiple effects (or elements) are described herein, if the term "or" is used between the multiple effects (or elements), it means that the effects (or elements) may exist independently, but it does not exclude that the multiple effects (or elements) may coexist. In other words, as long as the description is reasonable, the term "or" may involve the meaning of "and".

Figure 1:
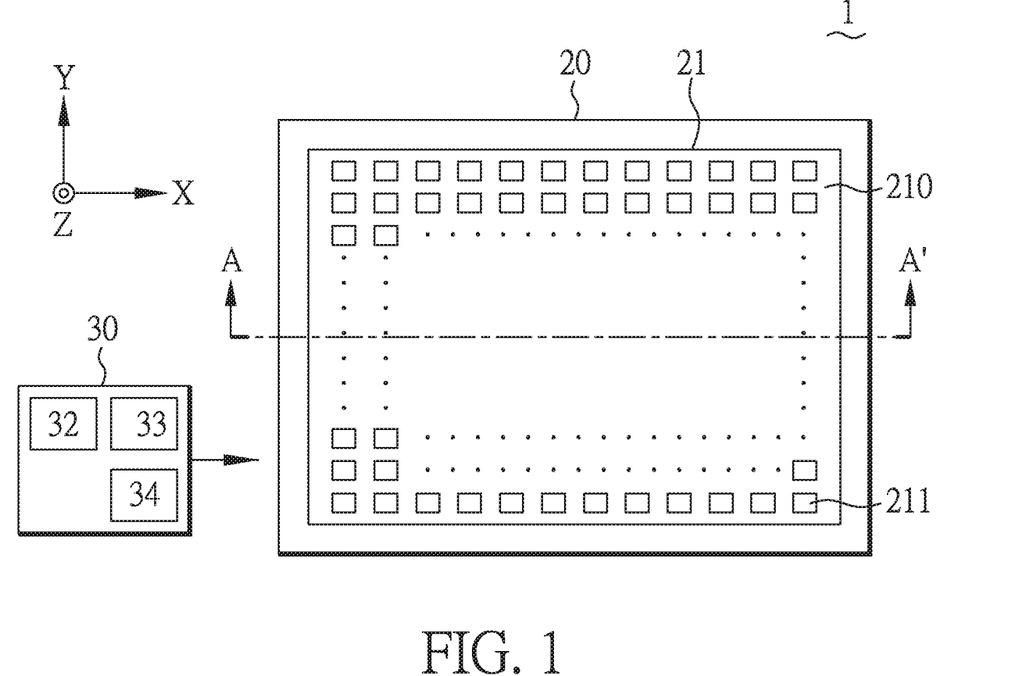
FIG. 1 is a schematic diagram illustrating a basic structure of a spatial light modulator according to an embodiment of the present disclosure.

FIG. 1 is a schematic diagram illustrating a basic structure of a spatial light modulator 1 according to an embodiment of the present disclosure. As shown in FIG. 1, the spatial light modulator 1 includes at least a panel 20 and a panel driver 30. The panel driver 30 (e.g. a LCOS driver board 30) may be disposed on a circuit board, and may include a driving logic circuit 32 and a memory 33, but is not limited thereto. The panel driver 30 is electrically connected to the panel 20 for driving the panel 20. The panel 20 includes a backplane 21, and the backplane 21 includes a pixel array 210. The pixel array 210 is composed of a plurality of pixel units 211, and the pixel array 210 is provided with a pixel density of at least 4000 PPI (pixels per inch). For clear illustration, in the embodiment of FIG. 1, when the spatial light modulator 1 is placed on a first plane (XY plane) formed by a first direction (X direction) and a second direction (Y direction), the display surface of the panel 20 is parallel to the first plane and faces the third direction (Z direction or display direction).

In one embodiment, the panel 20 may be, for example, a liquid crystal on silicon (LCOS) panel, but is not limited thereto. In one embodiment, the backplane 21 may be a complementary metal-oxide-semiconductor (hereinafter abbreviated as CMOS) substrate. That is, the pixel array 210 may be a CMOS array, and the pixel unit 211 may be a CMOS unit. Alternatively, in another embodiment, the backplane 21 may be a thin-film transistor (hereinafter abbreviated as TFT) substrate or a printed circuit board (hereinafter abbreviated as PCB), but is not limited thereto. In one embodiment, the backplane 21 may be subject to transmissive backplane technology or reflective backplane technology, but is not limited thereto. In one embodiment, the driving logic circuit 32 of the panel driver 30 may be, for example, a field programmable gate array (hereinafter abbreviated as FPGA), an application specific integrated circuit (hereinafter abbreviated as ASIC), or a customized adjustment chip, but is not limited thereto. Accordingly, the panel driver 30 is provided with programmable characteristics.

In one feature of the present disclosure, the panel driver 30 (LCOS driver board 30) drives the panel 20 according to a fast panel driving procedure design. In another feature of the present disclosure, some elements of the panel 20 are made of special materials.

Figure 2:
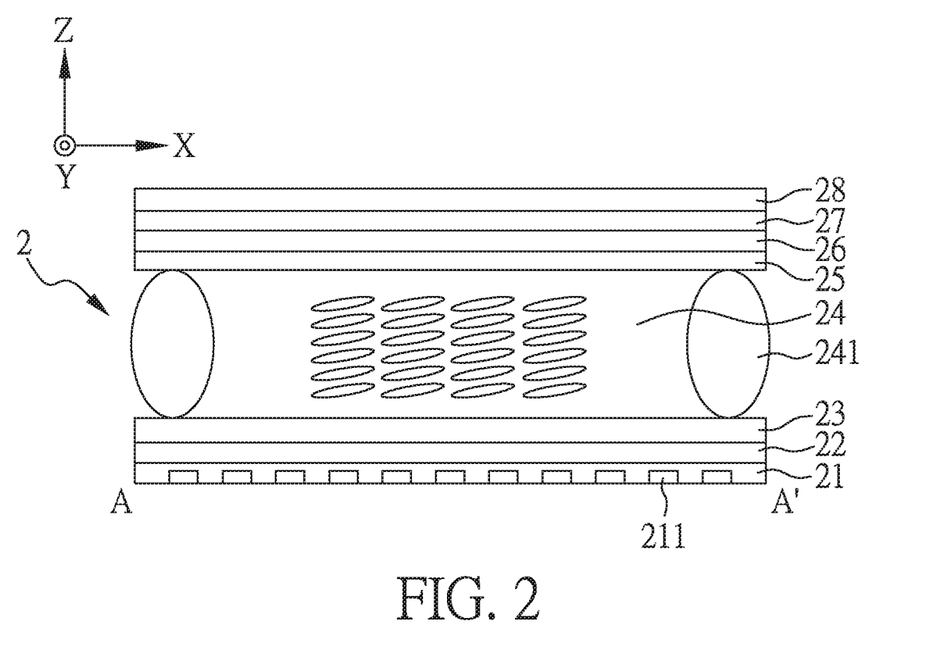
FIG. 2 is a partial cross-sectional view taken along a line A-A' of the spatial light modulator of FIG. 1.

Next, a special structural configuration of the panel 20 will be described in detail. FIG. 2 is a partial cross-sectional view taken along a line A-A' of the spatial light modulator 1 of FIG. 1, which is provided to explain the detailed configuration of the panel 20 in the third direction (Z direction). As shown in FIG. 2, the panel 20 may include a backplane 21, a reflective layer 22, a first alignment layer 23, a liquid crystal layer 24, a second alignment layer 25, a transparent electrode (for example, an indium tin oxide, hereinafter abbreviated as ITO) layer 26, and a glass cover plate 27. Viewed along the Z direction, the reflective layer 22 may be disposed on the backplane 21, the first alignment layer 23 may be disposed on the reflective layer 22, the liquid crystal layer 24 may be disposed on the first alignment layer 23, the second alignment layer 25 may be disposed on the liquid crystal layer 24, the transparent electrode layer 26 may be disposed on the second alignment layer 25, and the glass cover plate 27 may be disposed on the transparent electrode layer 26, but the present disclosure is not limited thereto.

In one embodiment, the backplane 21 is a substrate with ultra-high pixel density, and the pixel density is at least 4000 PPI (that is, the panel 20 of the spatial light modulator 1 of the present disclosure supports at least 1920×1080 resolution). In one embodiment, the reflective layer 22 may be provided to reflect a portion of light to improve the reflectivity of the panel 20, and the reflective layer 22 may include a metal material, such as aluminum, silver, copper, chromium or titanium, but is not limited thereto. In one embodiment, the first alignment layer 23 and the second alignment layer 25 may be provided to control the arrangement of liquid crystal molecules in the liquid crystal layer 24. The first alignment layer 23 and the second alignment layer 25 may include organic materials or inorganic materials, and the first alignment layer 23 and the second alignment layer 25 may include a polyimide (PI) layer or a silicon oxide layer (SiOx, where x is a positive integer), wherein "silicon oxide" includes all kinds of oxide of silicon, such as silicon monoxide (SiO), silicon dioxide (SiO2), and the like, and is not limited thereto. In one embodiment, the transparent electrode layer 26 may provide conductivity or light transmission, and may serve as a display electrode of the panel 20, wherein the transparent electrode layer 26 may be, for example, an ITO layer, but is not limited thereto. In one embodiment, the glass cover plate 27 may protect the components underneath it, and allows light to penetrate. In addition, in some embodiments, a semi-reflective film 28 may be further provided on the glass cover plate 27 for allowing part of the light to penetrate and for reflecting part of the light, wherein the term "semi-reflective" means that part of the light will penetrate and part of the light will be reflected, but not limiting the reflectivity to 50%.

In particular, the liquid crystal layer 24 of the present disclosure is a liquid crystal material having an ultra-high figure-of-merit (FoM). The liquid crystal material may be provided with a first figure-of-merit (FoM-1), wherein the first figure-of-merit (FoM-1) satisfies the following condition:

$$FoM\text{-}1 = \frac{\Delta n^2}{\left(\frac{\gamma_1}{k_{11}}\right)} > 15 \ \mu m^2/s,$$

where FoM-1 represents the first figure-of-merit, $\Delta n$ represents the birefringence of the liquid crystal material, $\gamma_1$ represents the rotational viscosity coefficient of the liquid crystal material, and $k_{11}$ represents the splay elastic constant of the liquid crystal material.

From the satisfied condition of the first figure-of-merit, it can be known that the liquid crystal material is preferably liquid crystal of high birefringence ($\Delta n$), which is characterized in exhibiting a highly linear electrical-optical (EO) response. Therefore, the spatial light modulator 1 of the present disclosure is provided with better phase linearity.

In one embodiment, the liquid crystal material may be further provided with a second figure-of-merit (FoM-2), wherein the second figure-of-merit satisfies the following condition:

$$FoM\text{-}2 = \frac{\Delta \epsilon * \Delta n^2}{\left(\frac{\gamma_1}{k_{11}}\right)} > 230 \ \mu m^2/s,$$

where FoM-2 represents the second figure-of-merit, and $\Delta \epsilon$ represents the dielectric anisotropy of the liquid crystal material.

From the satisfied condition of the first figure-of-merit or the second figure-of-merit, it can be known that the ultra-high figure-of-merit liquid crystal used in the spatial light modulator 1 can be provided with a super birefringence. In comparison with the products of the prior art, the cell gap between the liquid crystal molecules of the panel 20 in accordance with the present disclosure may be reduced, so as to increase the liquid crystal response time and suppress the fringing field effect. In one embodiment, the cell gap between the liquid crystal molecules of the panel 20 may be between 1.48 and 2.10 micrometers (i.e., 1.48 μm≤cell gap≤2.10 μm), but is not limited thereto. Since the cell gap is reduced and the ratio of cell gap to pitch (d/p) of the panel 20 is also be reduced, the spatially anamorphic phenomenon of the liquid crystal may also be reduced.

In addition, since the ultra-high figure-of-merit liquid crystal material is also provided with the characteristic of enabling the phase linearity of the liquid crystal to be closer to an ideal value, the spatial light modulator 1 of the present disclosure may also maintain good phase linearity.

Next, the fast panel driving procedure design will be described.

First, the implementation of the fast panel driving procedure design is described. In one embodiment, the content of the fast panel driving procedure design may be implemented by a driving procedure 34, wherein the driving procedure 34 may be, for example, a parameter setting file that can be read by a software, a firmware, or a software and hardware interface. The driving procedure 34 may be stored in the memory 33 of the panel driver 30 and, when the driving procedure 34 is executed, the driving logic circuit 32 may drive the panel 20 according to the content of the fast panel driving procedure design. In one embodiment, the driving procedure 34 may include a plurality of instructions, so that the driving logic circuit 32 may drive the panel 20 according to the instructions. In one embodiment, the driving procedure 34 may include a plurality of subprograms. In addition, when being software or firmware, the driving procedure 34 may be written in various programming languages, while there is no limitation on how to write the program code. In other words, as long as the software or firmware can realize the fast panel driving procedure design, it is included in the scope of the present disclosure. In another embodiment, the memory 33 of the panel driver 30 is provided with a changeable parameter setting file, so that some parameters in the driving procedure 34 can be modified. However, the present disclosure is not limited thereto.

Figure 3:
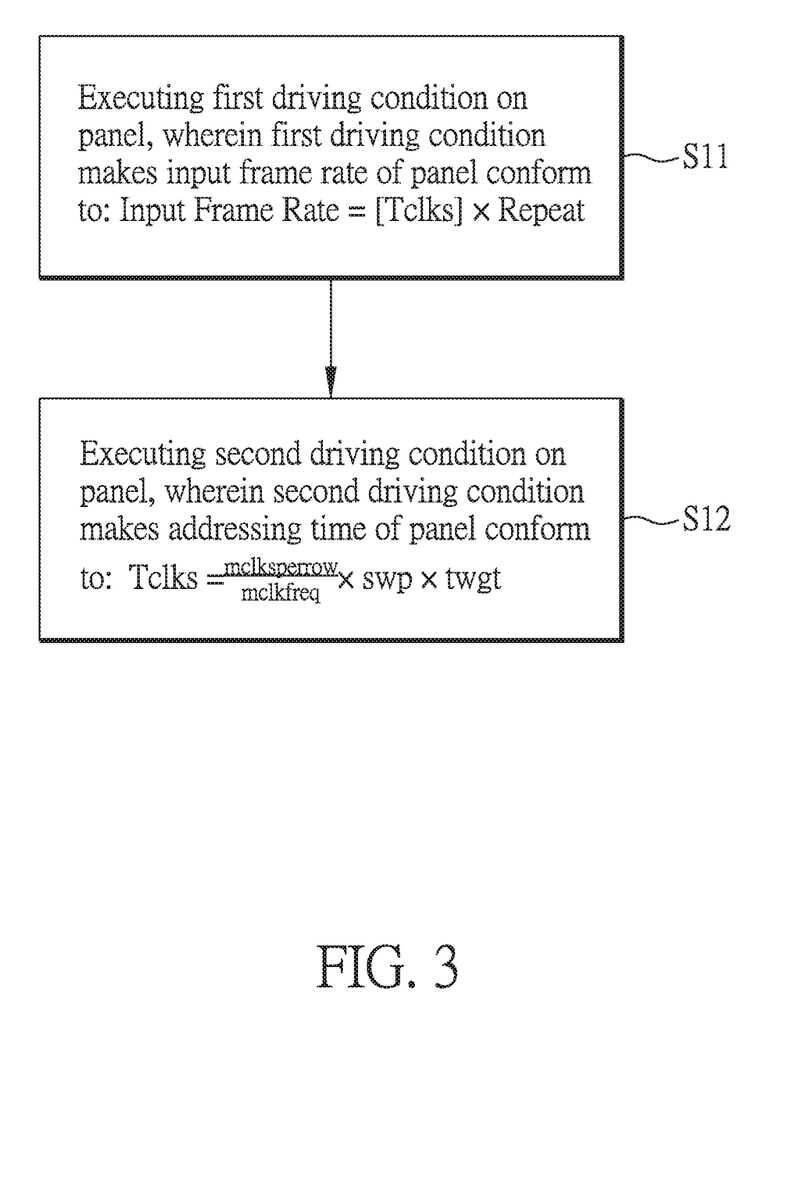
FIG. 3 is a flowchart illustrating the main steps of a fast panel driving procedure design according to an embodiment of the present disclosure.

Next, the fast panel driving procedure design will be explained by referring to FIG. 3, which is a flowchart illustrating the main steps of the fast panel driving procedure design according to an embodiment of the present disclosure, and also referring to FIG. 1 and FIG. 2 at the same time. As shown in FIG. 3, the driving procedure 34 includes a step S11 for executing a first driving condition on the panel 20, wherein the first driving condition is provided to make the input frame rate of the panel 20 conform to the following condition:

Input Frame Rate=[$T$clks]×Repeat, where "Input Frame Rate" represents the input frame rate, which may correspond to an actual display period of the same frame; Tclks represents an addressing frequency or an addressing time of a single frame, which may correspond to a driving period of the single frame; and "Repeat" represents the number of repeated driving of the single frame during the actual display period of the frame.

With the first driving condition, the panel 20 repeatedly displays the same single frame during the actual display period of the frame. That is, the driving voltage of the single frame is repeatedly applied, so that the brightness of the frame may be maintained with a specific stability. Therefore, the problem of phase flicker caused by higher driving voltage and faster response time may be reduced, so as to maintain the phase stability. In addition, in order to smoothly execute the first driving condition, the driving procedure 34 also includes step S12 for executing a second driving condition on the panel 20, wherein the second driving condition is provided to make the addressing time of the panel 20 conform to the following condition:

$$Tclks = \frac{mclksperrow}{mclkfreq} \times swp \times twgt,$$

where the parameter mclksperrow represents the number of memory clocks allocated to a row-writing of the pixel array 210, the parameter mclkfreq represents a memory clocks frequency, the parameter swp represents a division amount for all rows of the pixel array 210 (for example, indicating the number of portions obtained from dividing all rows of the pixel array 210), and the parameter twgt represents a data input weight for corresponding to an allocation situation when an image data is inputted to the pixel array. In addition, $$\frac{mclksperrow}{mclkfreq}$$

may be regarded as the reading unit time of the memory corresponding to a row of pixels in the pixel array 210;

$$\frac{mclksperrow}{mclkfreq} \times swp$$

may be regarded as the reading unit time of the memory corresponding to a screen, for example, the reading unit time of the memory of a frame range (that is, the entire pixel array 210) before receiving image data; and $$\frac{mclksperrow}{mclkfreq} \times swp \times twgt$$

may be regarded as the driving time of a frame range (including the process of receiving image data), wherein the parameter twgt is a digital addressing sequence, which may present part of the image data obtained from each divided portion of the pixel array 210.

In one embodiment, the pixel rows of the pixel array 210 may be divided equally, or may be divided proportionally according to a predetermined specific value. In one embodiment, the content of the parameter twgt or how the pixel rows are divided can be designed through a sequence bit-plane driving syntax "LSB (least significant bit, binary counted bit)-STH (similar thermometer)-THM (thermosmeter, linear counting)-WTB (write to black)", but it is not limited thereto. For details on the sequence bit-plane driving syntax, please refer to U.S. Pat. No. 9,918,053 for "System and method for pulse-width modulating a phase-only spatial light modulator" granted to Lo, et al. (hereinafter referred to as document 1), which is incorporated herein for reference.

It is noted that the execution sequence of the aforementioned steps S11 and S12 is only an example and, in practical application, the steps S11 and S12 may be executed in different sequence or executed at the same time.

Figure 4:
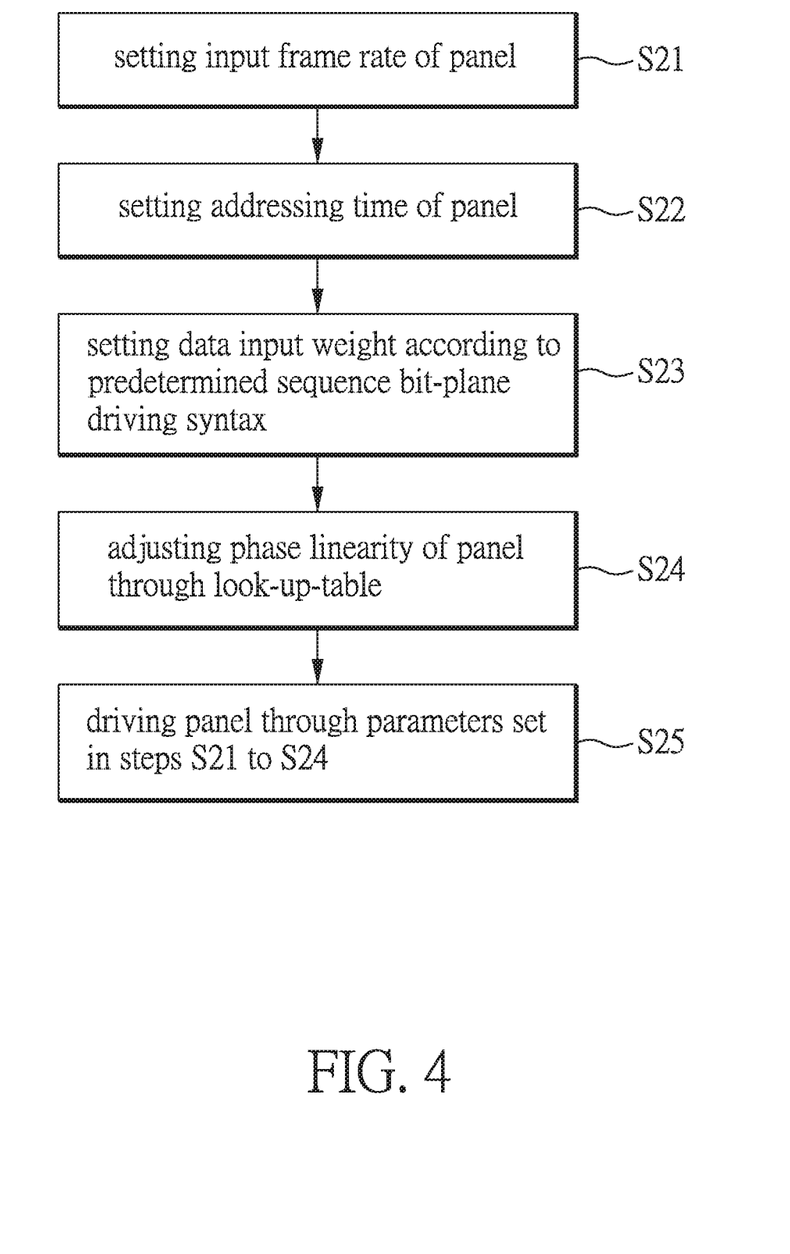
FIG. 4 is a flowchart illustrating the detail steps executed by a driving procedure according to an embodiment of the present disclosure.

Next, the actual execution process of the driving procedure 34 will be described. FIG. 4 is a flowchart illustrating the detail steps executed by the driving procedure according to an embodiment of the present disclosure. With reference to FIG. 4 as well as FIGS. 1 to 3, the actual execution steps of the driving procedure 34 include steps S21 to S25. The step S21 is provided to set the input frame rate of the panel 20. The step S22 is provided to set the addressing time of the panel 20. The step S23 is provided to set a data input weight (twgt) according to a predetermined sequence bit-plane driving syntax. The step S24 is provided to adjust the phase linearity of the panel 20 through a look-up-table (LUT). The step S25 is provided to drive the panel 20 through the parameters set in the aforementioned steps S21 to S24. The execution sequence of the aforementioned steps is only an example and, as long as it is reasonably achievable, the execution sequence of the steps may be changed or the steps may be executed at the same time.

In one embodiment, the step S21 is provided to set a value of the input frame rate, wherein the input frame rate is preset to 60 hertz (Hz), but is not limited thereto. In one embodiment, the input frame rate may be adjusted according to the user requirement. For example, the setting parameters of the input frame rate stored in the parameter setting file of the memory 33 may be adjusted, but it is not limited thereto. In one embodiment, the number of pixel units 211 to be driven and the input frame rate may be controlled by adjusting a pixel-clock frequency between the panel driver 30 and the signal interface of the panel 20, but it is not limited thereto.

Regarding the step S22, in one embodiment, the addressing time is set according to the second driving condition, wherein the second driving condition may be regarded as the addressing frequency of the panel 20, and this condition is also the optical fluctuation frequency of the panel 20. In one embodiment, the memory writing time of the panel 20 (that is, the parameter $$(\frac{mclksperrow}{mclkfreq})$$

must be set to be shorter than a frame update time $$(\frac{iclksperrow}{iclkfreq},$$

in which the parameter iclksperrow represents the number of clocks for a pixel row to perform image update, and the parameter iclkfreq represents the frequency for a pixel row to perform image update), so as to avoid generation of unnecessary noise from the panel driver 30 (the LCOS driver board 30) end due to the overlap of the memory writing period and the frame update period.

Figure 5:
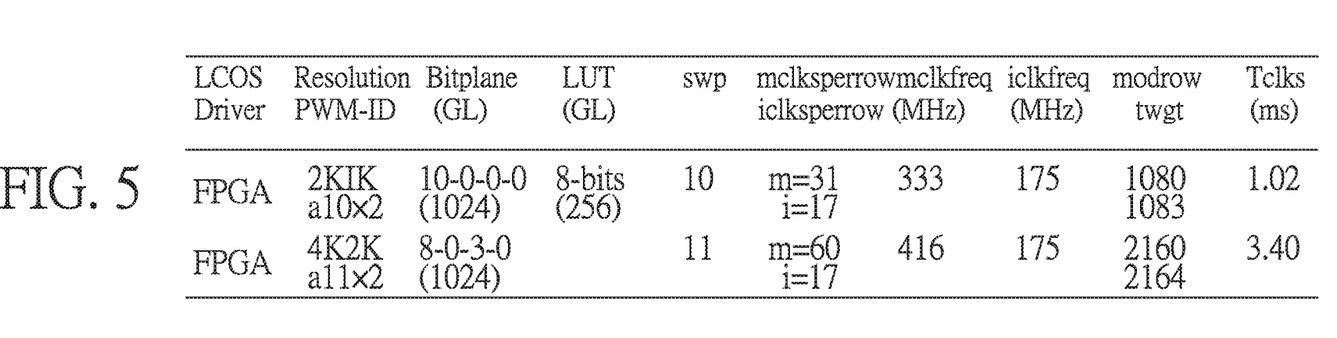
FIG. 5 is a diagram illustrating a comparison between driving parameters of different pixel densities according to an embodiment of the present disclosure.

Regarding the step S23, in one embodiment, the memory 33 may be pre-stored with a sequence bit-plane driving syntax, and the driving logic circuit 32 may find the corresponding data input weight (twgt) from the sequence bit-plane driving syntax according to the size of the panel 20, but it is not limited thereto. In one embodiment, the magnitude of the data input weight (twgt) has a positive relationship with the pixel density of the pixel array 210. FIG. 5 is a diagram illustrating a comparison between driving parameters of different pixel densities (for example, parameters in the second driving condition) according to an embodiment of the present disclosure. With reference to FIG. 5 as well as FIGS. 1 to 4, when the spatial light modulator 1 has a 2K resolution, its data input weight (twgt) may be 1083 and, when the spatial light modulator 1 has a 4K resolution, its data input weight (twgt) may be 2164, so that the larger the pixel density is, the larger the preset data input weight (twgt) will be. In one embodiment, the data input weight (twgt) is at least 1080 for corresponding to the minimum pixel density of the pixel array 210 (for example, 4000 PPI).

Regarding the step S24, in one embodiment, the gray scale value and the phase value of the panel 20 may be presented in a linear relationship through a look-up-table. In one embodiment, the light intensity of each gray level value of the panel 20 may be measured by a photodetector and converted into a phase value, and the phase value corresponding to each gray level value may be further compared with the ideal value of each grayscale value preset in the look-up-table, so as to perform correction according to the difference, but the present disclosure is not limited thereto. In one embodiment, the difference between the phase value corresponding to each gray level value and the ideal value of the look-up-table can be evaluated by the average phase accuracy error (APAE) and root-mean-square (RMS). In one embodiment, the details of the step S24 may be obtained from section 2.3 of the document "Jhou-Pu Yang, Feng-Ying Wu, Pei-Sin Wang, and Huang-Ming Philip Chen, Characterization of the spatially anamorphic phenomenon and temporal fluctuations in high-speed, ultra-high pixels-per-inch liquid crystal on silicon phase modulator" (hereinafter referred to as document 2), but it is not limited thereto.

After the steps S21 to S24 are executed, various parameters of the fast panel driving procedure design are set, and the driving logic circuit 32 may execute the step S25 to drive the panel 20 according to the fast panel driving procedure design.

Accordingly, in one embodiment, by using a liquid crystal material of high figure-of-merit as the liquid crystal layer 24 and using the fast panel driving procedure design to drive the panel 20, the spatial light modulator 1 of the present disclosure may simultaneously achieve the effects of "fast liquid crystal response time", "full-phase-modulation voltage", "ultra-high pixel density panel", "high phase stability", "high phase linearity", "high phase precision", being applicable to logic driving and digital driving" and so on. It is noted that the present disclosure is not limited to provision of the aforementioned effects at the same time.

Regarding the effect of "fast liquid crystal response time", one of the conditions for achieving this effect is to use a liquid crystal material of high figure-of-merit. With the liquid crystal material of high figure-of-merit, liquid crystal molecules may still provide a liquid crystal full-phase-modulation response time of less than 10 ms even at low voltage (~2V) when the liquid crystal cell gap is small. In comparison, the existing spatial light modulator with a liquid crystal response time of less than 10 ms on the market generally needs to be driven by a larger voltage (>5V). However, the present disclosure is not limited thereto.

Regarding the effect of "full-phase-modulation voltage", one of the conditions for achieving this effect is that, when using the fast panel driving procedure design, the driving voltage for driving the panel 20 must satisfy specific conditions. In one embodiment, the driving voltage includes a high-voltage frame (Vw) and a low-voltage frame (Vb), wherein the high-voltage frame (Vw) is between 2V and 8V (2V≤Vw≤8V), and the low-voltage frame (Vb) is between 0.1V and 3V (0.1V≤Vb≤3V). In addition, in one embodiment, the difference between the high-voltage frame (Vw) and the low-voltage frame (Vb) must be not greater than 5V (|Vw−Vb|≤5V), and not less than 1V (|Vw−Vb|≥1V). However, the present disclosure is not limited thereto.

Regarding the effect of "ultra-high pixel density panel", one of the conditions to achieve this effect relies on the setting of the data input weight of the fast panel driving procedure design. When the pixel density is getting higher, the data input weight will also increase accordingly, so that the addressing time of the panel 20 is adjusted accordingly, thereby enabling the driving of the panel 20 to satisfy the pixel density requirement. The ultra-high pixel density herein is known to have a pixel density ≥4000 PPI and a panel resolution ≥1920×1080. However, the present disclosure is not limited thereto.

Regarding the effect of "high phase stability", one of the conditions for achieving this effect is that the same frame needs to be repeatedly displayed during the actual display period in which a frame is displayed on the panel 20, so as to maintain the driving voltage of the frame. That is, the driving of the panel 20 must satisfies the first driving condition, thereby reducing the problem of phase instability caused by static flicker of the frame. In addition, another two conditions for achieving "high phase stability" are that the addressing time of the panel 20 must be shorter than the fastest liquid crystal response time condition (i.e., Rising time; Tr) under full grayscale to avoid disturbing the panel when the liquid crystal is dynamically switched in an electrical addressing process, and that the memory reading time must also be shorter than the operating time of switching frames to avoid the problem of signal overlapping in the electrical addressing process. However, the present disclosure is not limited thereto.

Regarding the effect of "good phase linearity", one of the conditions for achieving this effect is to use a liquid crystal material of high figure-of-merit. Due to the characteristics of the liquid crystal material of high figure-of-merit, it can be adapted to the situation where the cell-gap-to-pixel-pitch ratio (d/p) of the panel 20 is reduced. For general non-figure-of-merit liquid crystal materials, the reduction of the cell-gap-to-pixel-pitch ratio (d/p) is a difficult condition, because this condition requires a larger voltage condition to achieve full-phase modulation and the response time at this moment becomes larger while the non-linearity of the liquid crystal is also obvious. Therefore, it is difficult for general liquid crystal materials of non-figure-of-merit to achieve high phase linearity. In contrast, the present disclosure may still achieve high phase linearity under these conditions, wherein the relationship between phase linearity and cell-gap-to-pixel-pitch ratio (d/p) may be referred to the associated description in document 2. In addition, another condition for achieving "good phase linearity" is that a liquid crystal material of high figure-of-merit has a high birefringence and is capable of providing a relatively linear electro-optic response (EO). A further another condition for achieving "good phase linearity" is that the driving procedure 34 of the present disclosure executes step S24 to use a look-up-table to adjust the phase linearity. However, the present disclosure is not limited thereto.

Regarding the effect of "high phase precision", since the phase precision is related to the uniformity of the panel 20, the present disclosure achieves a thinner liquid crystal cell gap by using a liquid crystal material of high figure-of-merit so as to achieve the aforementioned effect. Although other studies in the past have tried to develop LCOS-SLM with thinner liquid crystal cell gaps, these studies are unable to control the uniformity of the panel to achieve a high phase precision standard (mSTD<0.04π), resulting in that the aforementioned effect cannot be demonstrated. To show forth the aforementioned effect and accurately quantify the improved LCOS-SLM data, the present disclosure makes use of the high-quality LCOS-SLM pairing technology to achieve high panel uniformity, thereby eliminating disturbance of data analysis caused by poor phase precision. However, the present disclosure is not limited thereto.

Regarding the effect of "being applicable to logic driving and digital driving", one of the conditions for achieving this effect is to use the fast panel driving procedure design. Through the fast panel driving procedure design, when the panel 20 is driven in a digital manner, it does not cause the problem of phase instability as in the existing products, and when the panel 20 is driven in a logic manner, it still maintains high phase linearity under many difficult conditions. Therefore, the present disclosure is applicable to both logic driving and digital driving.

Accordingly, the present disclosure is able to solve the problems that cannot be overcome by the prior art.

With the aforementioned effects, the panel 20 of the spatial light modulator 1 may be provided with many applications, and these applications may be greatly different from the existing products, which are described below with some examples.

In one embodiment, the panel 20 of the spatial light modulator 1 is designed to be driven by a liquid crystal response time while maintaining a phase stability, wherein the liquid crystal response time of the panel 20 is not greater than 10 ms, the phase stability corresponds to an average peak-to-peak value (Ave P-P), and the average peak-to-peak value is not greater than 3 percentages (Ave P-P≤3%). To achieve this phase stability standard, the existing products usually require about 3 times the response time. In addition, the existing products cannot achieve the effects of liquid crystal response time of less than 10 ms and high phase stability. Taking the fast response LETO-VIS-017 recently developed by HEP cooperation as an example, although its liquid crystal response time is about 6 ms, its phase stability error is greater than 20 percentages (Ave P-P>20%). Accordingly, the spatial light modulator 1 of this embodiment has solved a problem that cannot be overcome by the prior art.

In another embodiment, the panel 20 of the spatial light modulator 1 is designed to be driven by a full-phase operating voltage while maintaining a phase stability, wherein the full-phase-modulation operating voltage includes a high-voltage frame (Vw) and a low-voltage frame (Vb). The high-voltage frame (Vw) is between 2V to 8V (2V≤Vw≤8V), and the low-voltage frame (Vb) is between 0.1V to 3V (0.1V≤Vb≤3V). In this embodiment, when Vw=2.1 and Vb=0.7, the phase stability corresponds to an average peak-to-peak value, and the average peak-to-peak value is not greater than 3 percentages (3%). In one embodiment, the difference between the high-voltage frame (Vw) and the low-voltage frame (Vb) is not greater than 5V (|Vw−Vb|≤5V). In one embodiment, the panel 20 is further designed to perform driving in a digital driving manner, wherein a high-voltage frame (Vw) may correspond to a digital logic state 1 and the low-voltage frame (Vb) may correspond to a digital logic state 0, but it is not limited thereto. The existing products cannot achieve the effects of full-phase operating voltage and high phase stability at the same time under the condition of high-voltage frame (Vw)>2.0 V, and thus the spatial light modulator 1 of this embodiment has solved the problem that existing technology cannot overcome.

In still another embodiment, the panel 20 is further designed to be driven through a liquid crystal response time, while maintaining a phase linearity, and maintaining a phase precision. The liquid crystal response time is not greater than 10 ms. The phase linearity corresponds to an APAE (average peak to peak) value, and the APAE value is not greater than 1.5 percentages (1.5%). The phase precision corresponds to an mSTD (mean standard deviation) value. The mSTD value is not greater than 0.04π (mSTD≤0.04π). The existing products cannot achieve the effects of maintaining high phase linearity, high phase precision, and fast liquid crystal response time at the same time. Taking the existing product (such as SVGA series or SXGA series) of HMP (Hamamatsu Photonic) corporation as an example, although it may maintain phase linearity and phase precision, its liquid crystal response time has been greater than 30 ms. Taking the existing product (such as HSP1920 series) of MLO (Meadowlark Optics) corporation as an example, although it may improve the liquid crystal response time and achieve high phase stability, an APAE value corresponding to its phase linearity is about 10-15%, and an mSTD value corresponding to its phase precision is λ/20, which do not satisfy the requirements. Accordingly, the spatial light modulator 1 of this embodiment has solved a problem that cannot be overcome by the prior art.

Figure 6:
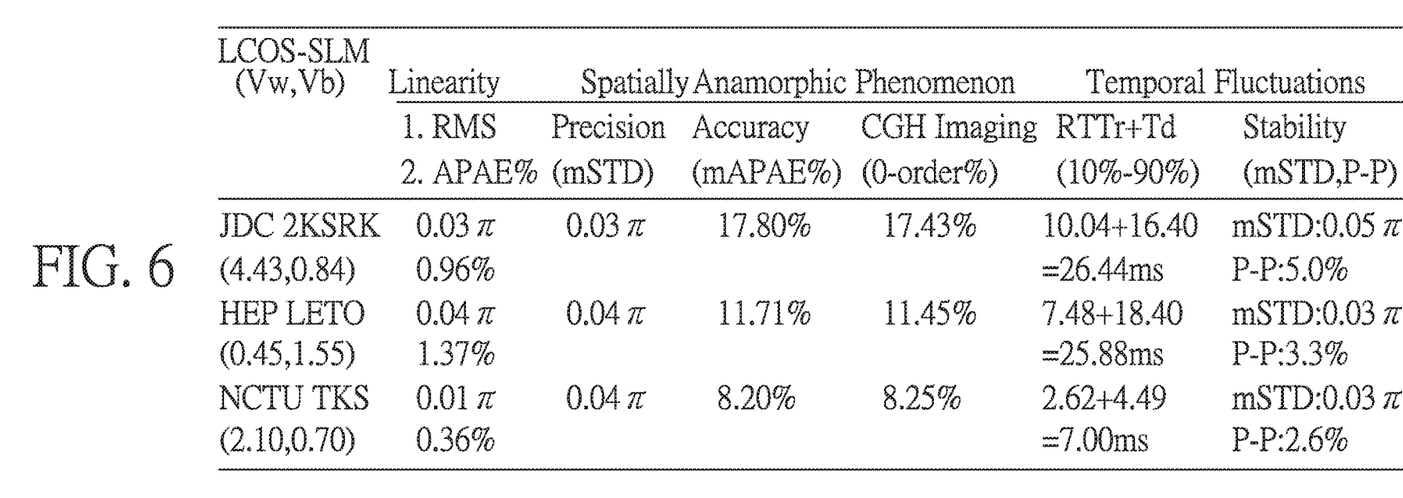
FIG. 6 is a diagram illustrating an experimental test comparison between a spatial light modulator according to an embodiment of the present disclosure and comparative examples.

In order to verify the effects of the present disclosure, an experimental result is used as a verification example. FIG. 6 is a diagram illustrating an experimental test comparison between a spatial light modulator according to an embodiment of the present disclosure and comparative examples. Please refer to FIG. 6 as well as FIGS. 1 to 5. In FIG. 6, the spatial light modulator 1 of this embodiment is an experimental machine, which is referred to as "NCTU TKS", and the comparative examples are the 2KSRK series product of JDC (Jasper Display Corporation) and the LETO series product of HEP (Holoeye Photonics) corporation, which are referred to as "JDC 2KSRK" and "HEP LETO", respectively. In addition, the experimental parameters are set as follows: the "NCTU TKS" liquid crystal material is provided with the birefringence (Δn) set to about 0.386, the dielectric anisotropy (Δε) set to about 15.6, the liquid crystal cell-gap-to-pitch ratio (d/p) set to about 0.28, and the high-voltage frame (Vw) of the driving voltage set to about 2.1V, and the low-voltage frame (Vb) of the driving voltage set to about 0.7V; the "JDC 2KSRK" liquid crystal material is provided with the birefringence (Δn) set to about 0.202, the dielectric anisotropy (Δε) set to about 10.1, the cell-gap-to-pixel-pitch ratio (d/p) set to about 0.59, the high-voltage frame (Vw) of the driving voltage set to about 4.43V, and the low-voltage frame (Vb) of the driving voltage set to about 0.84V; the "HEP LETO" liquid crystal material is provided with the birefringence (Δn) set to about 0.217, the dielectric anisotropy (Δε) set to about 40.0, the cell-gap-to-pixel-pitch ratio (d/p) set to about 0.38, the high-voltage frame (Vw) of the driving voltage set to about 1.55V, and the low-voltage frame (Vb) of the driving voltage set to about 0.45V. For other details about the experimental environment, please refer to the description in document 2, while it is noted that document 2 is only for reference but not a limitation of the present disclosure.

As shown in FIG. 6, in terms of the phase linearity, the APAE value of "JDC 2KSRK" is about 0.03π, the APAE value of "HEP LETO" is about 0.04π, and the APAE value of "NCTU TKS" is about 0.01π. In comparison, the phase linearity of the product of the present disclosure is obviously better. In terms of the phase precision, the mSTD value of "JDC 2KSRK" is about 0.03π, the mSTD value of "HEP LETO" is about 0.04π, and the mSTD value of "NCTU TKS" is about 0.04π. There is little difference between the three. In terms of the liquid crystal response time, the liquid crystal response time of "JDC 2KSRK" is approximately 26.44 ms, the liquid crystal response time of "HEP LETO" is approximately 25.88 ms, and the liquid crystal response time of "NCTU TKS" is approximately 7.11 ms. In comparison, the liquid crystal response time of the product of the present disclosure is significantly better than the other two. In terms of the phase stability, the P-P value of "JDC 2KSRK" is about 5%, the P-P value of "HEP LETO" is about 3.3%, and the P-P value of "NCTU TKS" is about 2.6%. Therefore, the product of the present disclosure has better phase stability. Accordingly, the product of the present disclosure may still have high liquid crystal response time under the condition of possessing phase stability, phase precision and phase linearity, thereby achieving the effects that cannot be realized by existing products.

In one embodiment, the spatial light modulator 1 of the present disclosure may be applied to products in the display technology industry, such as color sequence display, holographic display, VR display or AR display, and projection equipment, or to products in the photolithography industry, such as photo-holographic photolithography etching system or deep light 3D printing system, or to products in the optical sensing and image processing and detection industry, such as imaging system of SLM gain microscope or telescope, biomedical optical tweezers (light welding) system or 3D diffraction light array (Tx), and 3D light field image gain (Rx), or to products in the optical communication industry, such as the diffraction light gain WSS ROADM network system, or to products in the optical computing industry, such as the diffraction light depth neural network (All-optical computing) for performing deep learning computing, but it is not limited thereto.

Accordingly, the present disclosure provides an improved spatial light modulator. Through the improvement of the material itself in combination with the special driving method, the product of the present disclosure is able to solve the problems that cannot be overcome by the prior art.

The aforementioned embodiments are examples only for convenience of description. The scope of the present disclosure is claimed hereinafter in the claims and is not limited to the embodiments.

What is claimed is:

1. A spatial light modulator comprises:
   a panel including:
   a backplane having a pixel array, wherein the pixel array is provided with a pixel density of at least 4000 PPI (pixels per inch); and
   a liquid crystal layer having a liquid crystal material, wherein the liquid crystal material is provided with a first figure-of-merit; and
   a panel driver electrically connected to the panel for driving the panel according to a fast panel driving procedure design;
   wherein the first figure-of-merit satisfies condition:

$$FoM\text{-}1 = \frac{\Delta n^2}{\left(\frac{\gamma_1}{k_{11}}\right)} > 15 \ \mu m^2/s,$$

where FoM-1 represents the first figure-of-merit, Δn represents a birefringence of the liquid crystal material, $\gamma_1$ represents a rotational viscosity coefficient of the liquid crystal material, and $k_{11}$ represents a splay elastic constant of the liquid crystal material.

2. The spatial light modulator of claim 1, wherein the liquid crystal material is further provided with a second figure-of-merit, and the second figure-of-merit satisfies condition:

$$FoM\text{-}2 = \frac{\Delta\epsilon * \Delta n^2}{\left(\frac{\gamma_1}{k_{11}}\right)} > 230 \ \mu m^2/s,$$

where FoM-2 represents the second figure-of-merit, and Δε represents a dielectric anisotropy of the liquid crystal material.

3. The spatial light modulator of claim 1, wherein the fast panel driving procedure design is provided to enable an input frame rate of the panel to conform to condition:

Input Frame Rate=[Tclks]×Repeat, where "Input Frame Rate" represents an actual input frame rate, which corresponds to an actual display period of a same frame; Tclks represents an addressing frequency of a sub-frame, which corresponds to a driving period of the sub-frame; "Repeat" represents a number of repeated driving of the sub-frame during the actual display period of the frame.

4. The spatial light modulator of claim 3, wherein the addressing frequency is further set to conform to condition:

$$Tclks = \frac{mclksperrow}{mclkfreq} \times swp \times twgt,$$

where mclksperrow represents a number of memory clocks allocated to a row-writing of the pixel array, mclkfreq represents a memory clocks frequency, swp represents a division amount for all rows of the pixel array, and twgt represents a data input weight for corresponding to an allocation situation when an image data is inputted to the pixel array.

5. The spatial light modulator of claim 4, wherein the data input weight is set to have a positive relationship with the pixel density of the pixel array.

6. The spatial light modulator of claim 1, wherein the panel further includes an alignment layer and a glass cover plate, the alignment layer is disposed above the liquid crystal layer, the glass cover plate is disposed above the alignment layer, the driving logic circuit includes a field programmable gate array or an application specific integrated circuit, and the alignment layer includes a polyimide layer.

7. The spatial light modulator of claim 1, wherein the panel is designed to be driven by a liquid crystal response time while maintaining a phase stability, in which the liquid crystal response time is not greater than 10 ms, the phase stability corresponds to an average peak-to-peak value, and the average peak-to-peak value is not greater than 3 percentages.

8. The spatial light modulator of claim 1, wherein the panel 20 of the spatial light modulator 1 is designed to be driven by a full-phase operating voltage while maintaining a phase stability, in which the full-phase operating voltage includes a high-voltage frame (Vw) and a low-voltage frame (Vb), the high-voltage frame is between 2V to 8V, the low-voltage frame is between 0.1V to 3V, the phase stability corresponds to an average peak-to-peak value, and the average peak-to-peak value is not greater than 3 percentages (3%).

9. The spatial light modulator of claim 8, wherein the panel is further designed to be driven in a digital driving manner, wherein the high-voltage frame corresponds to a digital logic state 1 and the low-voltage frame corresponds to a digital logic state 0.

10. The spatial light modulator of claim 1, wherein the panel is designed to be driven by a liquid crystal response time while maintaining a phase linearity and a phase precision, in which the liquid crystal response time is not greater than 10 ms, the phase linearity corresponds to an APAE (average peak to peak) value, the APAE value is not greater than 1.5 percentages, the phase precision corresponds to an mSTD (mean standard deviation) value, and the mSTD value is not greater than 0.04π.

* * * * *